United States Patent
Sun et al.

(10) Patent No.: US 9,781,583 B2
(45) Date of Patent: Oct. 3, 2017

(54) DEVICE AND SERVICE DISCOVERY METHOD, AND DEVICE MIDDLEWARE

(71) Applicant: ZTE Corporation, Shenzhen, Guangdong (CN)

(72) Inventors: Aifang Sun, Shenzhen (CN); Chong Gao, Shenzhen (CN); Zhifei Zhang, Shenzhen (CN); Zhihao Ling, Shenzhen (CN); Yifeng Yuan, Shenzhen (CN); Xuewen Qi, Shenzhen (CN); Jianfu Cao, Shenzhen (CN)

(73) Assignee: XI'AN ZHONGXING NEW SOFTWARE CO. LTD., Xi'an (CN)

( * ) Notice: Subject to any disclaimer, the term of this patent is extended or adjusted under 35 U.S.C. 154(b) by 0 days.

(21) Appl. No.: 14/416,407

(22) PCT Filed: Jun. 24, 2013

(86) PCT No.: PCT/CN2013/077815
§ 371 (c)(1),
(2) Date: Jan. 22, 2015

(87) PCT Pub. No.: WO2014/015730
PCT Pub. Date: Jan. 30, 2014

(65) Prior Publication Data
US 2015/0172903 A1 Jun. 18, 2015

(30) Foreign Application Priority Data
Jul. 27, 2012 (CN) .......................... 2012 1 0264081

(51) Int. Cl.
H04L 12/18 (2006.01)
H04W 8/00 (2009.01)
(Continued)

(52) U.S. Cl.
CPC ........... *H04W 8/005* (2013.01); *H04L 12/189* (2013.01); *H04L 67/16* (2013.01); *H04W 4/08* (2013.01);
(Continued)

(58) Field of Classification Search
None
See application file for complete search history.

(56) References Cited

U.S. PATENT DOCUMENTS 7,443,833 B2 * 10/2008 Ayyagari ................ H04L 45/02
370/254
2006/0045039 A1 * 3/2006 Tsuneya .............. H04L 41/0816
370/318
(Continued)

FOREIGN PATENT DOCUMENTS

CN 101511061 A 8/2009
CN 101516127 A 8/2009
(Continued)

OTHER PUBLICATIONS

International Search Report in international application No. PCT/CN2013/077815, mailed on Oct. 3, 2013.
(Continued)

*Primary Examiner* — Huy D Vu
*Assistant Examiner* — Bao G Nguyen
(74) *Attorney, Agent, or Firm* — Oppedahl Patent Law Firm LLC

(57) ABSTRACT

A device and service discovery method and a piece of device middleware are provided. The method includes that a user terminal device broadcasts its own device information and service capability information, and searches for information about a surrounding service network, information about a device not joining the service network and service capability information about the device; if it is discovered that a service
(Continued)

network, which has a service capability needed by the user terminal device to accomplish a service, exists in the surrounding area, the user terminal device is configured to join the service network, and interact with a central node of the service network to accomplish the service; and if the service network is not discovered, the user terminal device selects a central node from devices which do not join a service network and have a service capability needed by the user terminal device to accomplish the service, is configured to generate a service network according to the selected central node, and interact with the selected central node to accomplish the service. A ubiquitous service can be provided through discovery, acquisition and networking of surrounding available service resources.

16 Claims, 3 Drawing Sheets

(51) Int. Cl.
    *H04L 29/08*     (2006.01)
    *H04W 48/16*     (2009.01)
    *H04W 4/08*     (2009.01)
    *H04W 8/24*     (2009.01)
    *H04W 40/24*     (2009.01)

(52) U.S. Cl.
    CPC ........... *H04W 8/24* (2013.01); *H04W 40/246* (2013.01); *H04W 48/16* (2013.01)

(56) References Cited

U.S. PATENT DOCUMENTS

| | | | |
|---|---|---|---|
| 2006/0198448 A1* | 9/2006 | Aissi | H04W 88/02 375/259 |
| 2006/0245360 A1* | 11/2006 | Ensor | H04L 29/12207 370/238 |
| 2007/0073914 A1* | 3/2007 | Yoshida | H04W 84/18 710/10 |
| 2008/0293404 A1* | 11/2008 | Scherzer | H04W 84/18 455/426.1 |
| 2009/0022092 A1 | 1/2009 | MacInnis | |
| 2009/0022096 A1 | 1/2009 | Walley | |
| 2011/0082939 A1 | 4/2011 | Montemurro | |
| 2011/0154084 A1* | 6/2011 | Vandwalle | H04W 8/005 713/324 |
| 2011/0216671 A1 | 9/2011 | Walley | |
| 2012/0084364 A1* | 4/2012 | Sivavakeesar | H04L 12/1818 709/205 |
| 2012/0110100 A1 | 5/2012 | Hiramatsu | |
| 2013/0094401 A1 | 4/2013 | MacInnis et al. | |
| 2013/0136033 A1* | 5/2013 | Patil | H04W 84/18 370/255 |

FOREIGN PATENT DOCUMENTS

| | | |
|---|---|---|
| JP | 2013507029 A | 2/2013 |
| KR | 20020069976 A | 9/2002 |
| WO | 2011039719 A1 | 4/2011 |

OTHER PUBLICATIONS

English Translation of the Written Opinion of the International Search Authority in international application No. PCT/CN2013/077815, mailed on Oct. 3, 2013.

Supplementary European Search Report in European application No. 13822403.5, mailed on Apr. 14, 2015.

* cited by examiner

DEVICE AND SERVICE DISCOVERY METHOD, AND DEVICE MIDDLEWARE

TECHNICAL FIELD

The disclosure relates to the technical field of wireless communications, and more particularly to a device and service discovery method, and a piece of device middleware.

BACKGROUND

With the development of information technology, more and more intelligent devices will inevitably emerge in people's living and working environment. To be able to make full use of multiple devices in users' surrounding, and provide users with real-time, efficient and high-quality services, it is required to make multiple devices cooperate to provide services together. Multiple devices cooperate on the premise that the devices can discover each other independently, interconnect and intercommunicate to form a network.

Device discovery in existing technology generally refers to obtaining information about surrounding devices through a channel broadcast or multicast message to form a network, and accomplishing, through user configuration, service transmission and presence based on the network; service discovery is not involved in the process of device discovery, so the device cannot accomplish the provision of a ubiquitous service independently. In addition, many communication protocols do not support an Ad hoc network architecture in the case of no pre-configuration, for example, a terminal device which supports a Wireless Fidelity (WIFI) communication protocol cannot find surrounding devices and services in the absence of Access Point (AP), which causes the device to be unable to independently accomplish service matching and the provision of a ubiquitous service.

SUMMARY

In view of this, the disclosure is mainly intended to provide a device and service discovery method and a piece of device middleware, so as to solve the problem that existing technology cannot implement service discovery and accomplish service matching and the provision of a ubiquitous service independently.

To this end, the technical solutions of the disclosure are implemented as follows.

A device and service discovery method is provided, which includes that:

a user terminal device broadcasts its own device information and service capability information, and searches for information about one or more service networks in a surrounding area, device information about one or more devices not joining the one or more service networks, and service capability information about the one or more devices;

when discovering that a service network, which has a service capability needed by the user terminal device to accomplish a service, exists in the surrounding area, the user terminal device is configured to join the service network, and to interact with a central node of the service network to accomplish the service; and when discovering that a service network, which has a service capability needed by the user terminal device to accomplish a service, does not exist in the surrounding area, the user terminal device selects a central node from devices which do not join a service network and have a service capability needed by the user terminal device to accomplish the service, is configured to generate a service network according to the selected central node, and interact with the selected central node to accomplish the service.

In an embodiment, configuring the user terminal device to join the service network may include:

configuring the user terminal device by a Station (STA) mode, setting a network Identity (ID), and sending a dynamic address obtaining request to the central node of the service network to obtain an Internet Protocol (IP) address allocated by the central node of the service network.

In an embodiment, configuring the user terminal device to generate a service network according to the selected central node includes:

configuring the selected central node by an AP mode, wherein the central node starts a dynamic address allocating service, and opens a dynamic address allocating port; and configuring the user terminal device by an STA mode, setting a network ID, and sending a dynamic address obtaining request to the selected central node to obtain an IP address allocated by the central node.

In an embodiment, a central node may be selected by one of the following ways:

a random selection way, a competitive selection way based on game theory, and a polling selection way.

In an embodiment, the information about the one or more service network may include ID number(s) of central node(s) of the one or more service networks, and ID number(s) of provided service(s).

In an embodiment, the device information may include a device ID, a port number, storage capacity, processing capacity and display capability.

A piece of device middleware is also provided, which is between a network layer and a Media Access Control (MAC) layer, and includes a service querying and calling module, an information broadcasting and searching module and a network configuration module; wherein the service querying and calling module is configured to query an application layer about device information and service capability information of the user terminal device;

the information broadcasting and searching module is configured to control the MAC layer to broadcast the device information and the service capability information of the user terminal device, and search for the information about one or more service networks in a surrounding area, information about one or more devices not joining the one or more service networks, and service capability information about the one or more devices;

the network configuration module is configured to, when discovering that a service network, which has a service capability needed by the user terminal device to accomplish a service, exists in the surrounding area, configure the user terminal device to join the service network and interact with a central node of the service network to accomplish the service;

the network configuration module is also configured to, when discovering that a service network, which has a service capability needed by the user terminal device to accomplish a service, does not exist in the surrounding area, select a central node from devices which do not join a service network and have a service capability needed by the user terminal device to accomplish a service, configure the user terminal device to generate a service network according to the selected central node, and interact with the selected central node to accomplish the service.

In an embodiment, the network configuration module may be further configured to configure the user terminal device to join the service network by the following way:

configuring the user terminal device by a STA mode, setting a network ID, and sending a dynamic address obtaining request to the central node of the service network to obtain an IP address allocated for the user terminal device by the central node of the service network.

In an embodiment, the network configuration module is further configured to configure the user terminal device to generate a service network according to the selected central node by the following way:

configuring the selected central node by an AP mode, wherein the central node starts a dynamic address allocating service, and opens a dynamic address allocating port; and configuring the user terminal device by an STA mode, setting a network ID, and sending a dynamic address obtaining request to the selected central node to obtain an IP address allocated for the user terminal device by the central node.

In an embodiment, the network configuration module is further configured to select a central node by one of the following ways:

a random selection way, a competitive selection way based on game theory, and a polling selection way.

Through the device and service discovery method and the device middleware provided by the disclosure, when a user terminal device enters an area where service devices are distributed, the user terminal device accomplishes service discovery and network configuration independently, aggregates device capabilities in a certain area independently, and accomplishes the provision of a unified service through cooperation with multiple devices. Since the device discovery and service discovery are processed simultaneously, transparent access to the service capability is realized, a complicated user configuration process is eliminated, and the best service experience of user can be obtained.

DETAILED DESCRIPTION

The technical solutions of the disclosure are further elaborated below in combination with the accompanying drawings and specific embodiments.

Figure 1:
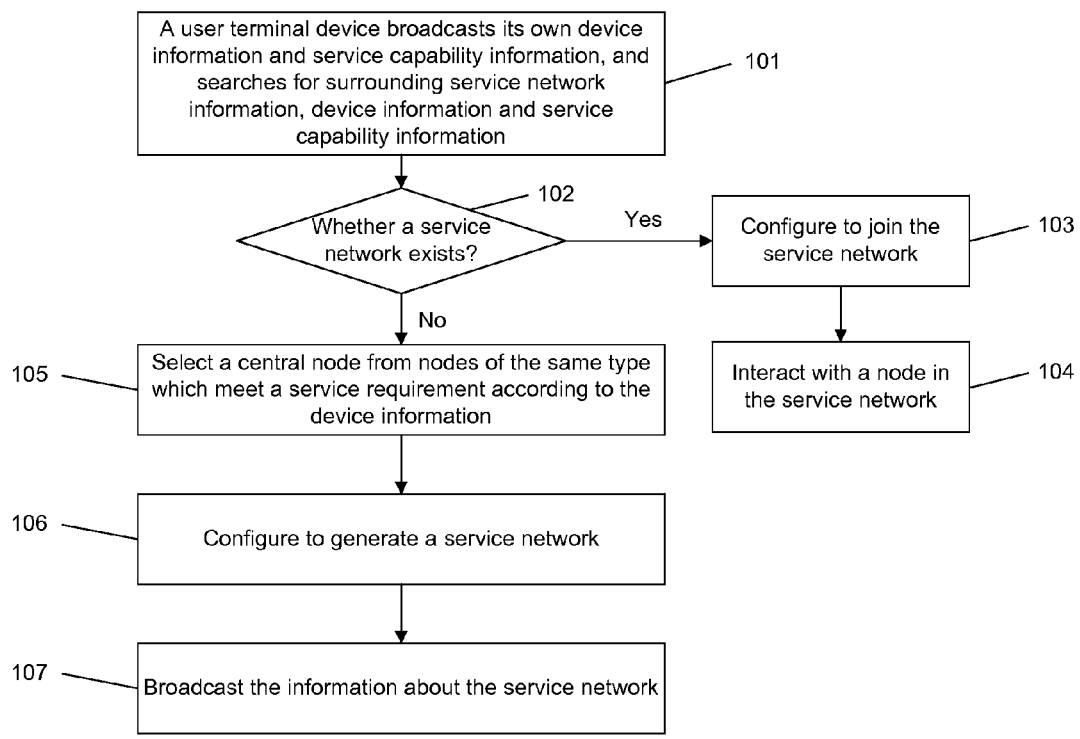
FIG. 1 is a flowchart of a device and service discovery method in an embodiment of the disclosure.

As shown in FIG. 1, a device and service discovery method provided by an embodiment of disclosure mainly includes the following steps.

Step 101: A user terminal device broadcasts its own device information and service capability information, and searches for information about one or more service networks in a surrounding area, information about one or more devices not joining the service network(s), and service capability information about the device(s).

When the user terminal device enters an area where service devices are distributed and needs to accomplish the provision of a certain service with the assistance of the service capabilities of surrounding devices, the user terminal device informs the surrounding devices of its own device information and service capability information through a broadcast or multicast message, wherein the device information includes a device ID, a port number, a storage capacity, a processing capacity, a display capability and so on; the service capability information is information about the service capability that the user terminal device can provide, such as a photographing function, a printing function, a video playing function and an audio playing function.

In addition, the user terminal device also receives broadcast messages from each communication channel, so as to search for the information about a surrounding service network, the information about a device not joining the service network, and the service capability information about the device. The searched information includes information about a service network existing in surrounding area, information about a device not joining the service network, and service capability information about the device. The information about a service network includes an ID number of the central node of the service network, and an ID number of a provided service, wherein the ID number of the provided service is for identifying the type of the service provided by the network; the device information includes a device ID, a port number, a storage capacity, a processing capacity, a display capability and so on; the device information is for identifying whether the device supports collaboration of specific services, and whether the device supports to become the central node; the service capability information about the device refers to the type of a service that the device not joining the service network provides or needs.

In this step, the user terminal device and the surrounding device having the service capability are required at least to be equipped with a same kind of short-haul communication interfaces to accomplish networking through an infrastructure network or an Ad hoc mode. The Ad hoc mode is a point-to-point networking mode.

Step 102: The user terminal device determines whether a service network, which has a service capability needed by the user terminal device to accomplish a service, exists in the area; if the service network exists, then Step 103 is executed; or else, Step 105 is executed.

If it is discovered by the user terminal device that the service network, which has a service capability needed by the user terminal device to accomplish a service, exists in the surrounding area, then Step 103 is executed; if it is not discovered that the service network, which has a service capability needed by the user terminal device to accomplish a service, exists in the surrounding area, then Step 105 is executed.

Step 103: The user terminal device accomplishes IP address configuration and joins the service network.

In this step, the user terminal device configures itself with a station (STA) mode, sets a network ID, and sends a dynamic address obtaining request to the central node (as an access node of the service network) of the service network to obtain an IP address allocated for the user terminal device by the central node of the service network and accomplish configuration. The central node is required to support a Dynamic Host Configuration Protocol (DHCP).

Step 104: The user terminal device interacts with a node in the service network to accomplish the provision of unified service together.

If a service needs to be provided with the help of the service capability of the central node in the service network, then the user terminal device interacts with the central node to accomplish the provision of unified service together; if the service needs to be provided further with the help of the service capabilities of other nodes in the service network, then the user terminal device is also required to interact with other nodes to accomplish the provision of unified service together.

Step 105: When it is determined that the service network, which has a service capability needed by the user terminal device to accomplish a service, does not exist, the user terminal device selects a central node from the devices which do not join a service network and have the service capability needed by the user terminal device to accomplish the service.

In this step, the user terminal device selects, from the searched devices which do not join the service network, devices which have the service capability needed by the user terminal device to accomplish the service to be candidates for the central node; the selection of the central node can be implemented by negotiation according to the information about each device, for example, the selection of the central node can be implemented by a random selection way, a competitive selection way based on a game theory, and a polling selection way and so on.

For example, if a policy of selecting a central node is "selecting the one with the strongest processing capacity", then the device with the strongest processing capacity is selected as the central node through competition according to the processing capacities of the devices which are candidates.

Step 106: A service network is generated according to the configuration of the selected central node.

The user terminal device configures the selected central node by an AP mode, and generates a service network; the central node starts a dynamic address allocating service, and opens a dynamic address allocating port, so as to prepare for dynamic address allocation; the user terminal device configures itself by an STA mode, sets a network ID, and sends a dynamic address obtaining request to the selected central node to obtain an IP address allocated by the central node and accomplish configuration. The selected central node is required to support the DHCP.

Step 107: The information about the service network is broadcasted, and the other devices are invited to join.

This step is an optional operation; after the central node is configured by an AP mode, the ID number of the service provided by the central node is modified or updated, and the information about the service network of the central node (including the ID number of the central node, and the ID number of the provided service) is broadcasted; the other devices can find the service network when searching surrounding networks.

If the accomplishment of unified service also needs cooperation with other devices, then the device needing cooperation may request to join the service network after finding the service network, or the service network actively invites the device needing cooperation to join.

By the above method, when the user terminal device enters the area where service devices are distributed, the user terminal device can accomplish service discovery and network configuration independently, aggregates device capabilities in a certain area independently, and accomplishes the provision of unified service through cooperation with multiple devices, thereby providing the best service experience for users.

Figure 2:
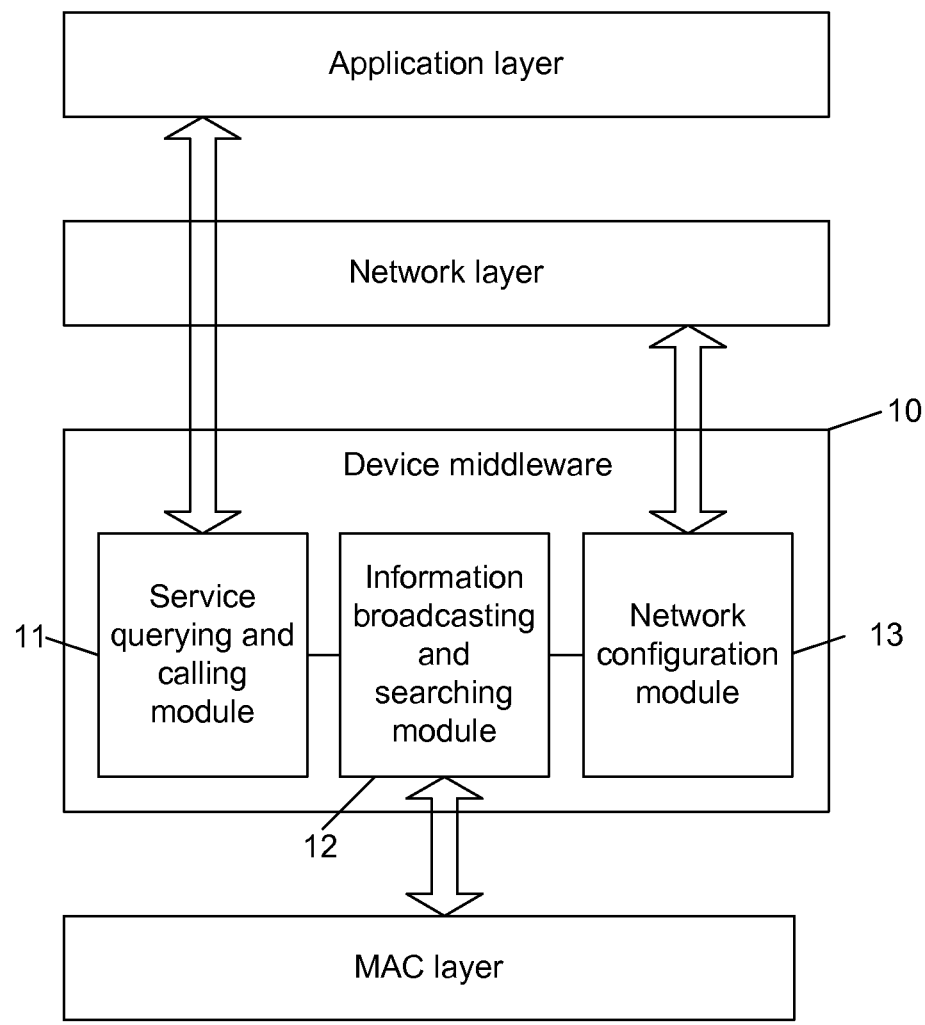
FIG. 2 is a structural diagram illustrating a piece of device middleware in an embodiment of the disclosure.

Corresponding to the device and service discovery method provided by an embodiment of disclosure, another embodiment of the disclosure provides a piece of device middleware applied to device and service discovery. As shown in FIG. 2, the device middleware 10 is between a network layer and an MAC layer; based on a cross-layer thought, the device middleware 10 performs, through multiple modules, information interaction with an application layer, the network layer and the MAC layer to complete the device and service discovery and the network configuration. The device middleware 10 includes a service querying and calling module 11, an information broadcasting and searching module 12 and a network configuration module 13.

The service querying and calling module 11 is configured to query the application layer about device information and service capability information of the user terminal device by interacting with the application layer; the service querying and calling module 11 supplies an Application Program Interface (API); the application layer inputs the device information and the service capability information of the user terminal device into the service querying and calling module 11 of the device middleware 10 by calling the API. In addition, when the device information and the service capability information in the application layer change, it is needed to call the API to input the latest device information and service capability information into the service querying and calling module 11 of the device middleware 10 in a way of event notification, for use in device and service discovery.

The information broadcasting and searching module 12 is configured to control the MAC layer to broadcast the device information and the service capability information of the user terminal device, and search for information about a surrounding service network, information about a device not joining the service network, and service capability information about the device.

The network configuration module 13 is configured to complete the process of network configuration by interacting with the network layer, including selection of a central node, generation of self-organized network, auto-configuration of node parameters (including a network type, a network ID and an IP address) and so on; specifically, when the information broadcasting and searching module 12 discovers that a service network, which has a service capability needed by the user terminal device to accomplish a service, exists in the surrounding area, the network configuration module 13 configures the user terminal device to join the service network and interacts with the central node of the service network to accomplish the service; when the information broadcasting and searching module 12 discovers that no service network, which has a service capability needed by the user terminal device to accomplish a service, exists in the surrounding area, the network configuration module 13 selects a central node from devices which do not join a service network and have the service capability needed by the user terminal device to accomplish the service, configures the user terminal device to generate a service network according to the selected central node, and interacts with the selected central node to accomplish the service.

In an embodiment, the network configuration module 13 is further configured to configure the user terminal device to join the service network by the following way:

configuring the user terminal device by the STA mode, setting a network ID, and sending a dynamic address obtaining request to the central node of the service network to obtain the IP address allocated for the user terminal device by the central node of the service network.

In an embodiment, the network configuration module 13 is further configured to generate a service network according to the selected central node by the following way:

configuring the selected central node by the AP mode, wherein the central node starts a dynamic address allocating service, and opens a dynamic address allocating port; and configuring the user terminal device by the STA mode, setting a network ID, and sending a dynamic address obtaining request to the selected central node to obtain the IP address allocated for the user terminal device by the central node.

In addition, the network configuration module 13 can select a central node by random selection way, a competitive selection way based on a game theory, and a polling selection way or other ways.

Figure 3:
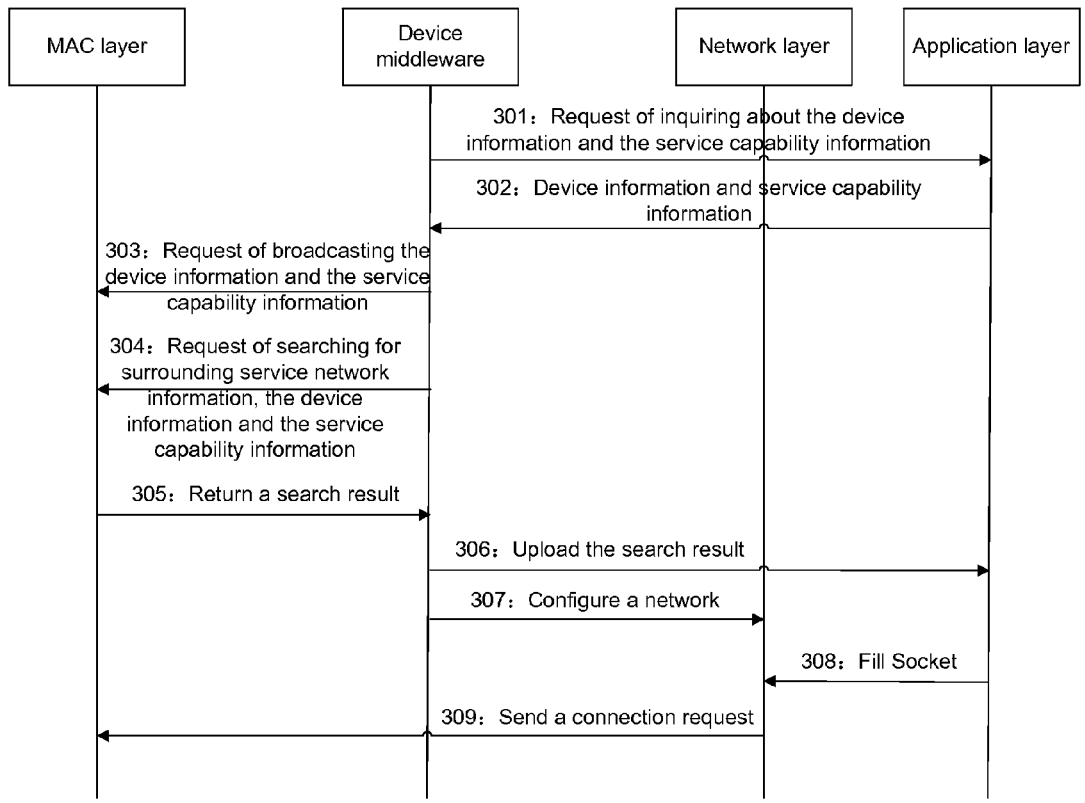
FIG. 3 is a flowchart illustrating a method that utilizes the device middleware to discover surrounding devices and services, and accomplish the provision of service in an embodiment of the disclosure.

The flow illustrating a method that utilizes the device middleware to discover surrounding devices and services, and accomplish the provision of service in an embodiment of the disclosure is elaborated below in combination with the structure of the device middleware shown in FIG. 2; as shown in FIG. 3, the flow mainly includes the following steps.

Step 301: The service querying and calling module of the device middleware sends to the application layer a request message of inquiring about the device information and the service capability information.

Step 302: The application layer calls the API of the device middleware to fill the requested device information and service capability information of the user terminal device, and sends the requested information to the device middleware.

In this step, when the device information and the service capability information change, the application layer needs to call the API provided by the device middleware to input the latest device information and service capability information to the device middleware in a way of event notification, for use in device and service discovery.

Step 303: The device middleware encapsulates the obtained device information and service capability information, and sends, through the information broadcasting and searching module, to the MAC layer a request message of broadcasting the device information and the service capability information.

Step 304: The information broadcasting and searching module sends to the MAC layer a request message of searching for the information about a surrounding service network, the information about a device not joining the service network, and the service capability information about the device.

Note that, Step 303 and Step 304 are not strictly required to be executed in order, they may be executed simultaneously.

Step 305: The MAC layer completes information broadcasting and searching, and returns search results to the device middleware.

The search results include the information about a surrounding service network, the information about a device not joining the service network, and the service capability information about the device.

Step 306: The service querying and calling module of the device middleware filters the search results and uploads them to the application layer.

The filtering means filtering, according to a service requirement, the search results to obtain a result meeting the service requirement.

Step 307: The network configuration module of the device middleware completes self-organized networking, generates network parameters and performs network configuration for nodes in the network according to the obtained information (namely the search results uploaded by the service querying and calling module).

Step 308: The application layer fills Socket according to application (namely the service requirement), for use in network layer connection.

Step 309: The network layer sends, through the MAC layer, a network connection request to a specified central node of network.

Figure 4:
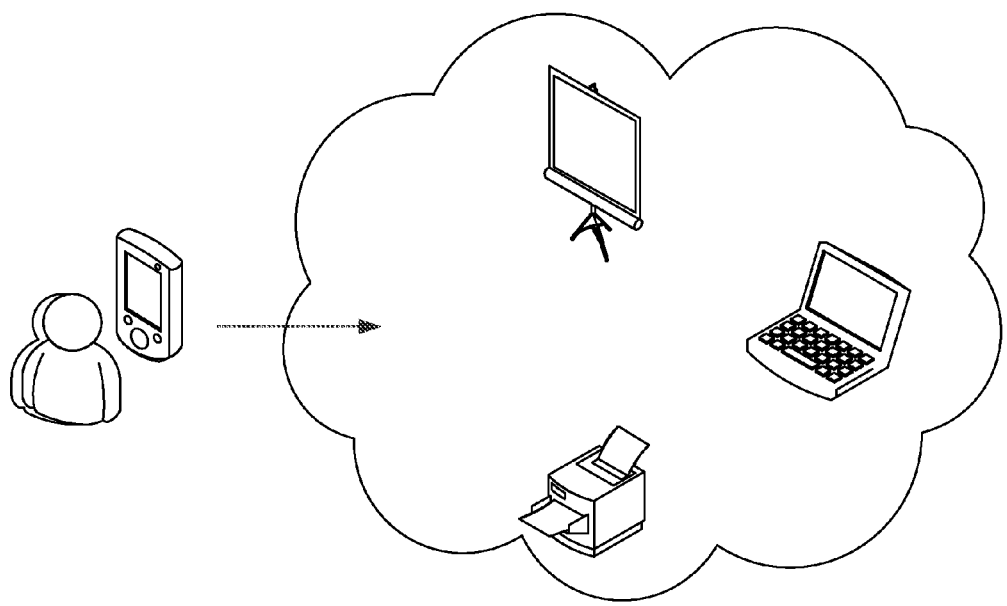
FIG. 4 is a diagram illustrating a specific application scenario of the discovery method in an embodiment of the disclosure.

FIG. 4 is a diagram of an embodiment that utilizes the method of the disclosure to provide a service.

As shown in FIG. 4, when a user carrying a mobile terminal enters an office area, a laptop, a projector and a printer in the area are detected through a broadcast message, and are configured automatically to form a user-service-requirement-oriented office network; a file carried by the user can be modified on the laptop, and can be printed by the printer; the file can also be projected through the projector to a display screen to display.

To sum up, through the device and service discovery method and the device middleware of the disclosure, when a user device enters an area where service devices are distributed, the user device accomplishes service discovery and network configuration independently, aggregates device capabilities in a certain area independently, and accomplishes the provision of unified service through cooperation with multiple devices. Since device discovery and service discovery are processed simultaneously, transparent access to the service capability is implemented, a complicated process of user configuration is eliminated, and the best service experience of user can be obtained.

The above are only the embodiments of the disclosure and not intended to limit the scope of the claims of the disclosure.

What is claimed is:

1. A device and service discovery method, comprising:
broadcasting, by a user terminal device, its own device information and service capability information, and searching for information about one or more service networks in a surrounding area, device information about one or more devices not joining the one or more service networks, and service capability information about the one or more devices, wherein the service capability information of the user terminal device is information about the service capability that the user terminal device can provide, and the service capability information of each of the one or more devices not joining the one or more service networks is the type of a service that the device provides or needs;

when discovering, according to the service capability information of the user terminal device and the information about the one or more service networks in the surrounding area, that a service network, which has a service capability needed by the user terminal device to accomplish a service, exists in the surrounding area, configuring the user terminal device to join the service network, and to interact with a central node of the service network to accomplish the service; and when discovering, according to the service capability information of the user terminal device and the information about the one or more service networks in the surrounding area, that a service network, which has a service capability needed by the user terminal device to accomplish a service, does not exist in the surrounding area, selecting, by the user terminal device according to the service capability information of the user terminal device and the service capability information of each of the one or more devices not joining the one or more service networks, a central node from devices which do not join a service network and have a service capability needed by the user terminal device to accomplish a service, configuring to generate a service network according to the selected central node, and interacting with the selected central node to accomplish the service, wherein the configuring to generate a service network according to the selected central node comprises:

configuring the selected central node by an Access Point (AP) mode, wherein the central node starts a dynamic address allocating service, and opens a dynamic address allocating port; and configuring the user terminal device by an STA mode, setting a network ID, and sending a dynamic address obtaining request to the selected central node to obtain an IP address allocated by the central node.

2. The device and service discovery method according to claim 1, wherein the configuring the user terminal device to join the service network comprises:

configuring the user terminal device by a Station (STA) mode, setting a network Identity (ID), and sending a dynamic address obtaining request to the central node of the service network to obtain an Internet Protocol (IP) address allocated by the central node of the service network.

3. The device and service discovery method according to claim 1, wherein the central node is selected by one of the following ways:

a random selection way, a competitive selection way based on a game theory, and a polling selection way.

4. The device and service discovery method according to claim 1, wherein the information about the one or more service networks comprises ID number(s) of central node(s) of the one or more service networks, and ID number(s) of provided service(s).

5. The device and service discovery method according to claim 1, wherein the device information comprises a device ID, a port number, a storage capacity, a processing capacity and a display capability.

6. Device middleware, which is between a network layer and a Media Access Control (MAC) layer, comprising a service querying and calling module, an information broadcasting and searching module and a network configuration module; wherein the service querying and calling module is configured to query an application layer about device information and service capability information of the user terminal device;

the information broadcasting and searching module is configured to control the MAC layer to broadcast the device information and the service capability information of the user terminal device, and search for information about one or more service networks in a surrounding area, information about one or more devices not joining the one or more service networks, and service capability information about the one or more devices, wherein the service capability information of the user terminal device is information about the service capability that the user terminal device can provide, and the service capability information of each of the one or more devices not joining the one or more service networks is the type of a service that the device provides or needs;

the network configuration module is configured to, when discovering, according to the service capability information of the user terminal device and the information about the one or more service networks in the surrounding area, that a service network, which has a service capability needed by the user terminal device to accomplish a service, exists in the surrounding area, configure the user terminal device to join the service network and interact with a central node of the service network to accomplish the service;

the network configuration module is also configured to, when discovering, according to the service capability information of the user terminal device and the information about the one or more service networks in the surrounding area, that a service network, which has a service capability needed by the user terminal device to accomplish a service, does not exist in the surrounding area, select, according to the service capability information of the user terminal device and the service capability information of each of the one or more devices not joining the one or more service networks, a central node from devices which do not join a service network and have a service capability needed by the user terminal device to accomplish a service, configure the user terminal device to generate a service network according to the selected central node, and interact with the selected central node to accomplish the service, wherein the network configuration module is further configured to configure the user terminal device to generate a service network according to the selected central node by the following ways:

configuring the selected central node by an Access Point (AP) mode, wherein the central node starts a dynamic address allocating service, and opens a dynamic address allocating port; and configuring the user terminal device by an STA mode, setting a network ID, and sending a dynamic address obtaining request to the selected central node to obtain an IP address allocated for the user terminal device by the central node.

7. The device middleware according to claim 6, wherein the network configuration module is further configured to configure the user terminal device to join the service network by the following way:

configuring the user terminal device by a Station (STA) mode, setting a network Identity (ID), and sending a dynamic address obtaining request to the central node of the service network to obtain an IP address allocated for the user terminal device by the central node of the service network.

8. The device middleware according to claim 6, wherein the network configuration module is further configured to select the central node by one of the following ways:

a random selection way, a competitive selection way based on game theory, and a polling selection way.

9. The device and service discovery method according to claim 2, wherein the central node is selected by one of the following ways:

a random selection way, a competitive selection way based on a game theory, and a polling selection way.

10. The device and service discovery method according to claim 2, wherein the information about the one or more service networks comprises ID number(s) of central node(s) of the one or more service networks, and ID number(s) of provided service(s).

11. The device and service discovery method according to claim 2, wherein the device information comprises a device ID, a port number, a storage capacity, a processing capacity and a display capability.

12. The device middleware according to claim 7, wherein the network configuration module is further configured to select the central node by one of the following ways:
a random selection way, a competitive selection way based on game theory, and a polling selection way.

13. The device and service discovery method according to claim 1, wherein the service capability that the user terminal device can provide comprises a photographing function, a printing function, a video playing function and an audio playing function.

14. The device and service discovery method according to claim 1, wherein the device information of the user terminal device includes a device ID, a port number, a storage capacity, a processing capacity, a display capability.

15. The device middleware according to claim 6, wherein the service capability that the user terminal device can provide comprises a photographing function, a printing function, a video playing function and an audio playing function.

16. The device middleware according to claim 6, wherein the device information of the user terminal device includes a device ID, a port number, a storage capacity, a processing capacity, a display capability.

* * * * *